United States Patent
Sun et al.

(10) Patent No.: US 10,229,087 B2
(45) Date of Patent: Mar. 12, 2019

(54) MANY-CORE PROCESSOR SYSTEM INTEGRATED WITH NETWORK ROUTER, AND INTEGRATION METHOD AND IMPLEMENTATION METHOD THEREOF

(71) Applicant: INSTITUTE OF COMPUTING TECHNOLOGY OF THE CHINESE ACADEMY OF SCIENCES, Beijing (CN)

(72) Inventors: Ninghui Sun, Beijing (CN); Zheng Cao, Beijing (CN); Qiang Li, Beijing (CN); Xiaoli Liu, Beijing (CN); Xiaobing Liu, Beijing (CN); Xuejun An, Beijing (CN); Peiheng Zhang, Beijing (CN); En Shao, Beijing (CN)

(73) Assignee: INSTITUTE OF COMPUTING TECHNOLOGY OF THE CHINESE ACADEMY OF SCIENCES, Beijing (CN)

( * ) Notice: Subject to any disclaimer, the term of this patent is extended or adjusted under 35 U.S.C. 154(b) by 84 days.

(21) Appl. No.: 15/319,230

(22) PCT Filed: Mar. 12, 2015

(86) PCT No.: PCT/CN2015/074106
§ 371 (c)(1),
(2) Date: Dec. 15, 2016

(87) PCT Pub. No.: WO2015/196833
PCT Pub. Date: Dec. 30, 2015

(65) Prior Publication Data
US 2017/0147528 A1    May 25, 2017

(30) Foreign Application Priority Data

Jun. 27, 2014 (CN) .......................... 2014 1 0302494

(51) Int. Cl.
*G06F 13/42* (2006.01)
*G06F 15/78* (2006.01)
(Continued)

(52) U.S. Cl.
CPC ............ *G06F 15/7825* (2013.01); *G06F 9/50* (2013.01); *G06F 13/4286* (2013.01); *G06F 15/17312* (2013.01); *H04L 69/22* (2013.01)

(58) Field of Classification Search
CPC .......... G06F 15/7825; G06F 15/17312; G06F 15/17306; G06F 15/173; G06F 13/4286; H04L 69/22
See application file for complete search history.

(56) References Cited

U.S. PATENT DOCUMENTS 8,175,107 B1 *  5/2012  Yalagandula ....... H04L 45/7453
                                                            370/408
8,626,266 B1 *  1/2014  Frank ..................... A61B 5/055
                                                            600/413

(Continued)

FOREIGN PATENT DOCUMENTS

CN    101540786 A    9/2009
CN    102752207 A   10/2012
(Continued)

*Primary Examiner* — Jing-Yih Shyu
(74) *Attorney, Agent, or Firm* — Maschoff Brennan

(57) ABSTRACT

A method for integrating a many-core processor system with a network router comprises a subnet division step used for dividing an on-chip network into network requests in multiple subnet balance chips, and a network interface device deployment step used for deploying at least one network interface device in a subnet in a distributed mode in order to guarantee optimization of the connectivity between the deployed network interface device and the processor cores in the subnets and to implement rapid data exchange of the on-chip network or the inter-chip network. A many-core processor system integrated with a network router comprises (Continued)

a network router used for network interfacing and data exchange, and comprising multiple network interface devices embedded into the on-chip network in a distributed mode.

7 Claims, 8 Drawing Sheets

(51) Int. Cl.
    *G06F 9/50*           (2006.01)
    *G06F 15/173*       (2006.01)
    *H04L 29/06*        (2006.01)

(56) References Cited

U.S. PATENT DOCUMENTS

| | | | |
|---|---|---|---|
| 9,231,888 B2* | 1/2016 | Bogdanski | H04L 49/253 |
| 2009/0138944 A1* | 5/2009 | Rajasekaran | G06F 21/62 |
| | | | 726/4 |

FOREIGN PATENT DOCUMENTS

| | | | |
|---|---|---|---|
| CN | 102799560 A | | 11/2012 |
| CN | 102819498 A | | 12/2012 |
| CN | 102831011 A | * | 12/2012 |
| CN | 104077138 A | | 10/2014 |

* cited by examiner

MANY-CORE PROCESSOR SYSTEM INTEGRATED WITH NETWORK ROUTER, AND INTEGRATION METHOD AND IMPLEMENTATION METHOD THEREOF

FIELD OF THE INVENTION

The invention relates to the multi-core or many-core processor system field, in particular to a system integrated with a network router in a processor.

DESCRIPTION OF THE RELATED ART

With the progress of the semiconductor technology and the increase of single-chip transistors, more and more processor cores can be integrated in a chip and multi-core/many-core processors have already been the mainstream of current processors. From the perspective of the balance design, increased number of processor cores greatly improves processor requirements for network performance. At present, network equipment bandwidth increases rapidly. By taking HCA (Host Channel Adapter) card of Infiniband as an example, up to 300 Gb/s bandwidth products were launched in 2014, there are proved 100 Gb/s Ethernet products, and the 400 Gb/s standard is under preparation. As 300 Gb/s bandwidth is equivalent to the current DDR3 memory access bandwidth, current network I/O systems need urgent optimization.

Currently, an important solution for improving network I/O performance is to integrate a network router in a processor. IBM Blue Gene series high-performance computers integrate high-performance network routers in processors. FIG. 1 shows a method for integrating an IBM Blue Gene/Q processor with a network router: merging a network router comprising an on-chip network interface, multiple on-chip network interfaces, multiple network processing engines and cross switches on an on-chip network (cross switch), wherein each of the on-chip network interfaces and the inter-chip network interfaces is provided with one network processing engine for processing a network protocol, the integrated network router exchanges data with the on-chip network via one on-chip network interface, the inter-chip network interface is used for communication with other processors only, and the cross switches implement data exchange in the router. The method for integrating a network router is disclosed in "The IBM Blue Gene/Q Compute Chip" in "IEEE Micro, vol (32):2, March 2012, Pages 48-60", Ruud Haring, Martin Ohmacht et al.

The structure in FIG. 1 has the following three problems: 1. there is only one interface between the router and the on-chip network, which limits network access bandwidth and fails to serve a large number of processor cores in a many-core server; 2. the router needs to implement two network interfaces (the inter-chip network interface and the on-chip network interface), and the number of port is the sum of the number of two types of network interfaces; and 3. an independent cross switch is also required in the router, which limits expandability of the router and increases area and routing complexity of the router.

DISCLOSURE OF THE INVENTION

A technical problem to be solved by the invention is to provide a many-core processor system integrated with a network router and integration method and implementation method thereof to overcome the problem of narrow network access bandwidth and requiring independent cross switch which is caused by the deployment mode of a centralized network router in the prior art.

In order to achieve the purpose, the invention provides a method for integrating a many-core processor system with a network router, which is applied to a many-core processor system comprising a processor, an on-chip network, an inter-chip network and a network router, and comprises:

a subnet division step: dividing the on-chip network into network requests in multiple subnet balance chips; and a network interface device deployment step: deploying at least one network interface device in a subnet in a distributed mode in order to guarantee optimization of the connectivity between the deployed network interface device and the processor cores in the subnet and to implement rapid data exchange on the on-chip network or the inter-chip network.

For the method for integrating a many-core processor system with a network router, the subnet division step further comprises:

a subnet division substep: dividing the subnets based on a weighted network-wide diffusion method to obtain the finally divided subnets.

For the method for integrating a many-core processor system with a network router, the weighted network-wide diffusion method comprises:

step 1: taking the on-chip network as a corresponding Figure G, the processor cores corresponding to vertices of Figure G and connection lines among the processor cores corresponding to edges of Figure G, the Figure G comprising a vertex set V, an edge set E and a weight set W, the Figure G being expressed as Figure G=(V,E,W);

step 2: setting initial diffusion values of the vertices in the vertex set V;

step 3: iteratively updating the diffusion values based on the initial diffusion values, obtaining a maximum absolute value of the difference between the diffusion values of adjacent vertices in iterative process and recording the edge corresponding to the maximum value; if the maximum value corresponds to the same edge in multiple iterative processes, deleting the edge corresponding to the maximum value, or proceeding with the iterative updating step of the diffusion values;

step 4: if the quantity of subnets obtained in the iterative updating step of the diffusion values does not increased, proceeding to the step of iteratively updating the diffusion values, or calculating modularity Q; if the modularity Q value increases in the calculation step of the modularity, proceeding to the step of iteratively updating the diffusion values, or forming a divided subnet;

step 5: if the diameter of the divided subnet is more than that of the subnet, continuing to divide the divided subnet and proceeding to the subnet division step, or judging size of the divided subnet according to the size threshold of the subnet;

step 6: if the size of the divided subnet is smaller than the size threshold of the subnet in the subnet size judgment step, combining the subnets and outputting the finally divided subnets; and step 7: if all the subnets meet the size threshold and the diameter of the subnet, outputting the finally divided subnets.

For the method for integrating a many-core processor system with a network router, the equation of diffusion and iteration in the step 3 meets the following definition: provided that the vertices L1, L2 . . . Ln are connected with each other, the equation is:

$$D_i = \frac{\sum_{j \in G} D_j W_{ij}}{\sum_{j \in G} W_{ij}} a_{ij}$$

wherein the Di and Dj are the diffusion values of point Li and Lj respectively, the $w_{ij}$ is the weight of an edge between the point Li and Lj; and the $a_{ij}$ is an element in an adjacent matrix of the Figure G.

For the method for integrating a many-core processor system with a network router, the calculation formula of the modularity Q is:

$$Q(k) = \sum_{i=1}^{k} \left[ \frac{L(V_i, V_i)}{L(V, V)} - \left( \frac{L(V_i, V)}{L(V, V)} \right)^2 \right]$$

wherein $L(V_i, V_j) = \sum_{m \in V_i, n \in V_j} w_{mn}$, the parameter Vi is a divided subnet, $w_{mn}$ is a weight of an edge between point in and point n, and the k is the quantity of the divided subnets.

For the method for integrating a many-core processor system with a network router, the on-chip network is divided into multiple subnets according to any one of the quantity of router ports, structural features of the on-chip network, network request characteristics in the processor and pin layout of the processor or any combination thereof in the subnet division step.

The invention further provides a many-core processor system integrated with a network router in which the method for integrating a many-core processor system with a network router is used; the processor system comprises a processor, an on-chip network and an inter-chip network, and the many-core processor system further comprises:

a network router for network interfacing and data exchange, and comprising multiple network interface devices embedded into the on-chip network in a distributed mode;

wherein the network interface devices are disposed within the subnets divided from the on-chip network and taken as a network interface in the same processor or among the processors for data exchange based on the on-chip network or the inter-chip network.

For the many-core processor system integrated with a network router, the on-chip network is divided into multiple subnets, and each of the subnet is provided with at least one network interface device.

For the many-core processor system integrated with a network router, the network interface device further comprises a network processing engine for parsing network data packet transmitted by the on-chip network interface and the inter-chip network interface to implement a network communication protocol.

The invention further provides an implementation method of a many-core processor system, which is applied to the many-core processor system integrated with a network router and comprising a processor, an on-chip network, an inter-chip network and a network router, and comprises:

a network interface device selection step: selecting a network interface device from the subnet according to the case that the network interface device meets functional requirements and performance requirements of the subnet; and a path calculation step: calculating the path from a source processor core to the target network interface device according to the selected network interface device.

Compared with the prior art, the invention has the following beneficial effects:

1. The network access capability is provided for each subnet so that network access requests from a large number of processor cores are distributed in multiple network interface devices, which improves the overall network access capability of the processor and helps to implement load balance of a large number of processor cores during network access;

2. The high-speed on-chip network is used to implement switch among network interface devices, saving private data exchange resources (e.g., cross switch in the router) for the routers in the processors of the prior art; and 3. The deployment strategy of the distributed network interface devices breaks through the expansibility limit of the centralized network router in a conventional processor, and improves the expansibility of the network router.

REFERENCE SIGNS IN THE ACCOMPANIED DRAWINGS

100: network router
101: network interface device
S100~S200, S1~S7, 310~320, 510~640, S300~S400, 410~450: implementation steps of all embodiments of the invention.

DETAILED DESCRIPTION

Hereinafter, the present invention will be described in detail with reference to the embodiments and accompanying drawings.

The key point of the invention is to divide the function of a high-speed network router into Network Interface (NI) function and Switch function:

1. Distributed deployment of network interfaces: dividing an on-chip network into subnets and configuring a network interface device for each subnet to improve the network access capability and implement network load balance among processor cores;

2. Implementation of switch function of on-chip network: directly merging the network interface devices on the high-speed on-chip network and replacing an internal independent cross switch of the original router with the switch function of the on-chip network to implement the switch function between network interface devices and processors, and among the network interface devices.

The invention discloses a method and system for integrating a high-speed network router in a multi-core/many-core processor: dividing the function of a high-speed network router into Network Interface (NI) function and Switch function; dividing an on-chip network into subnets and configuring a network interface device for each subnet to implement distributed injection of on-chip traffic, breaking through the expansibility limit of a centralized network router, and improving the expansibility of the network router. The network interface devices are functionally similar to the conventional network interface controller (NIC, or network card), the conventional network interface controller is merged on an I/O bus (e.g., PCI-Express), but the network interface devices of the invention are directly merged on the high-speed on-chip to implement the switch function between network interface devices and the processor cores, and among the network interface devices by the on-chip network. The dedicated switch parts of the router are replaced with the on-chip network, facilitating reduction of power consumption and area of the chip.

Figure 1:
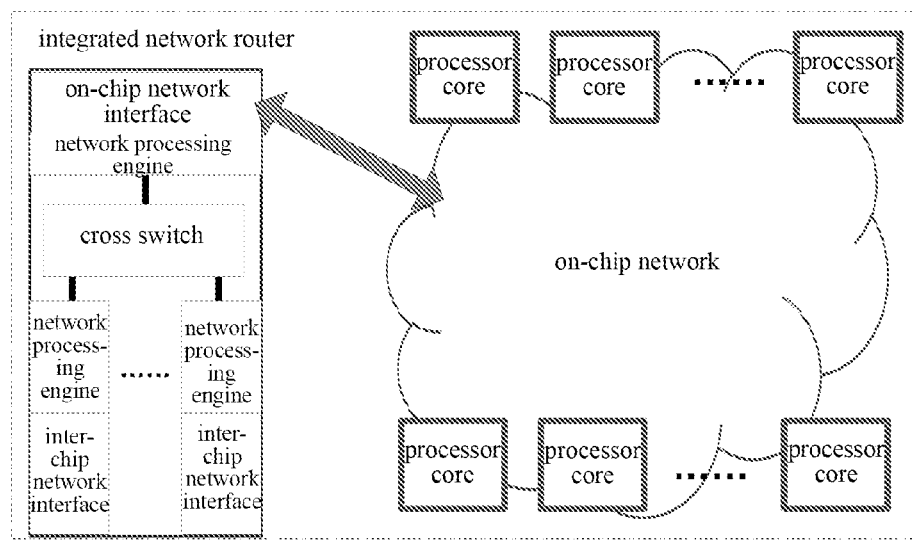
FIG. 1 is a structural diagram of an IBM Bluegene Q integrated network router in the prior art.
Figure 2:
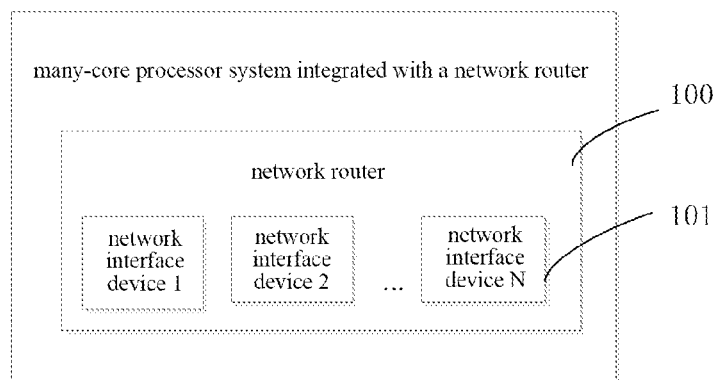
FIG. 2 is a structural diagram of a system of the invention.

The invention provides a many-core processor system integrated with a network router, comprising a processor, an on-chip network and an inter-chip network, as shown in FIG. 2, and further comprising:

a network router 100 for network interfacing and data exchange, and comprising multiple network interface devices 101 (network interface device 1, network interface device 2, . . . network interface device N) embedded into the on-chip network in a distributed mode.

The network interface devices 101 are disposed within the subnets divided from the on-chip network and taken as a network interface in the same processor or among the processors for data exchange based on the on-chip network or the inter-chip network.

The on-chip network is divided into multiple subnets, and each of the subnets is provided with at least one network interface device 101.

The network interface device 101 further comprises a network processing engine for parsing network data packet transmitted by the on-chip network interface and the inter-chip network interface to implement a network communication protocol.

Figure 3:
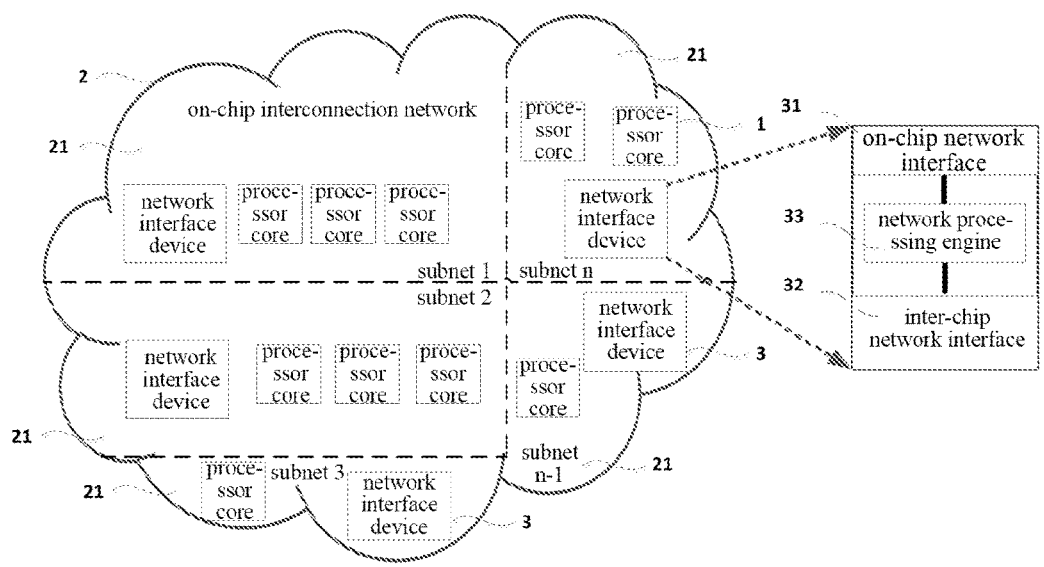
FIG. 3 is a structural diagram of a many-core processor integrated with a network router in an embodiment of the invention.

The structure of the many-core processor system of the invention is described in detail in combination with the accompanying drawings:

As shown in FIG. 3, the system of the invention comprises multiple processor cores 1, an on-chip network 2 and multiple network interface devices 3.

The processor cores 1 are designed to run computing tasks, and generate memory access and I/O requests. The invention does not define the instruction set of the processor cores, which can be X86, MIPS or ARM. In addition, the invention does not limit the quantity of the processor cores.

The on-chip network 2 is composed of multiple subnets 21 which are designed to implement high-speed interconnection of all parts in the processor, involving interconnection among the processor cores, interconnection between the processor cores and the memory controller, interconnection between the processor cores and Cache, and interconnection between the processor cores and the network interface devices. The invention neither limits the specific topological structure, performance and routing algorithm of the on-chip interconnection network, nor limits the support/rejection to Cache coherency protocol.

The subnets 21 of the on-chip network are designed to implement high-speed interconnection of internal parts in the processor, involving interconnection among the processor cores, and interconnection between the processor cores and the network interface devices.

The network interface device 3 is designed to receive and transmit data between the on-chip processor cores and an off-chip interconnection network, and each of the subnets on the on-chip network comprises a network interface device which is composed of an on-chip network interface 31, an inter-chip network interface 32 and a network processing engine 33. The invention does not define the quantities of the on-chip network interfaces 31, the inter-chip network interfaces 32 and the network processing engines 33.

The on-chip network interface 31 of the network interface device is designed to merge the network interface device on the on-chip network to receive and transmit data between the network interface device and parts (including the processor cores and the network interface device) on the same processor.

The inter-chip network interface 32 of the network interface device is designed to merge the network interface device on the inter-chip network (system-wide network for implementing interconnection among processors) to receive and transmit data between the network interface device and other processors.

The network processing engine 33 of the network interface device is designed to parse network data packets to implement a network communication protocol. The network processing engine in the invention can be a heterogeneous processor core designed for accelerating receiving and transmission of data over the network, such as a network processor core.

Figure 4:
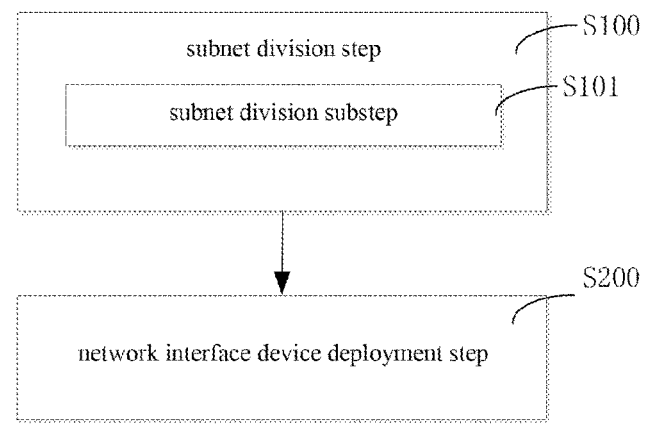
FIG. 4 is a flow diagram of a method for integrating a many-core processor with a network router of the invention.

The invention further provides a method for integrating a many-core processor system with a network router, applied to a many-core processor system comprising a processor, an on-chip network and an inter-chip network. As shown in FIG. 4, the method comprises:

a subnet division step S100: dividing the on-chip network into network requests in multiple subnet balance chips; and a network interface device deployment step S200: deploying at least one network interface device in a subnet in a distributed mode in order to guarantee optimization of the connectivity between the deployed network interface device and the processor cores in the subnet and to implement rapid data exchange of the on-chip network or the inter-chip network.

The subnet division step S100 further comprises:

a subnet division substep S101: dividing the subnets based on a weighted network-wide diffusion method to obtain the finally divided subnets.

The on-chip network is divided into multiple subnets according to any one of the quantity of router ports, structural features of the on-chip network, network request characteristics in the processor and pin layout of the processor or any combination thereof in the subnet division step.

Figure 5:
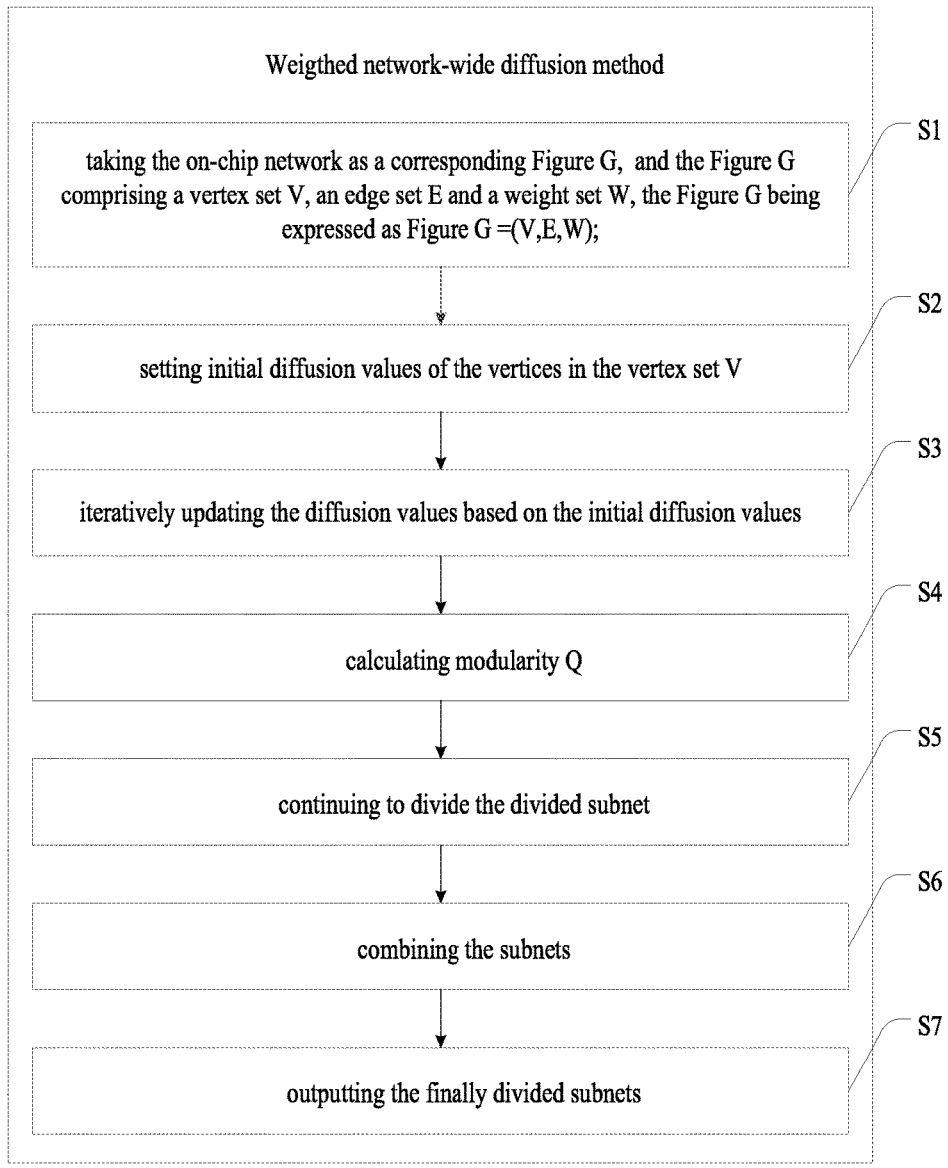
FIG. 5 is a flow diagram of a weighted network-wide diffusion method of the invention.

As shown in FIG. 5, the weighted network-wide diffusion method comprises:

step S1: taking the on-chip network as a corresponding Figure G, the processor cores corresponding to vertices of Figure G and connection lines among the processor cores corresponding to edges of Figure G, and the Figure G comprising a vertex set V, an edge set E and a weight set W, the Figure G being expressed as Figure G=(V,E,W);

step S2: setting initial diffusion values of the vertices in the vertex set V;

step S3: iteratively updating the diffusion values based on the initial diffusion values, obtaining a maximum absolute value of the difference between the diffusion values of adjacent vertices in iterative process and recording the edge corresponding to the maximum value; if the maximum value corresponds to the same edge in multiple iterative processes, deleting the edge corresponding to the maximum value, or proceeding with the iterative updating step of the diffusion values;

step S4: if the quantity of subnets obtained in the iterative updating step of the diffusion values does not increased, proceeding to the step of iteratively updating the diffusion values, or calculating modularity Q; if the modularity Q value increases in the calculation step of the modularity, proceeding to the step of iteratively updating the diffusion values, or forming a divided subnet;

step S5: if the diameter of the divided subnet is more than that of the subnet, continuing to divide the divided subnet and proceeding to the subnet division step, or judging size of the divided subnet according to the size threshold of the subnet;

step S6: if the size of the divided subnet is smaller than the size threshold of the subnet in the subnet size judgment step, combining the subnets and outputting the finally divided subnets; and step 7: if all the subnets meet the size threshold and the diameter of the subnet, outputting the finally divided subnets.

The equation of diffusion and iteration in the step 3 meets the following definition: provided that the vertices L1, L2 . . . Ln are connected with each other, the equation is:

$$D_i = \frac{\sum_{j \in G} D_j \times w_{ij}}{\sum_{j \in G} w_{ij}} \times a_{ij}$$

The Di and Dj are the diffusion values of point Li and Lj respectively, the $w_{ij}$ is the weight of an edge between the point Li and Lj; and the $a_{ij}$ is an element in an adjacent matrix of the Figure G.

The calculation formula of the modularity Q is:

$$Q(k) = \sum_{i=1}^{k} \left[ \frac{L(V_i, V_i)}{L(V, V)} - \left( \frac{L(V_i, V)}{L(V, V)} \right)^2 \right]$$

$L(V_i, V_j) = \sum_{m \in V_i, n \in V_j} w_{mn}$, the parameter Vi is a divided subnet, $w_{mn}$ is the weight of an edge between point m and point n, and k is the quantity of the divided subnets.

Figure 6:
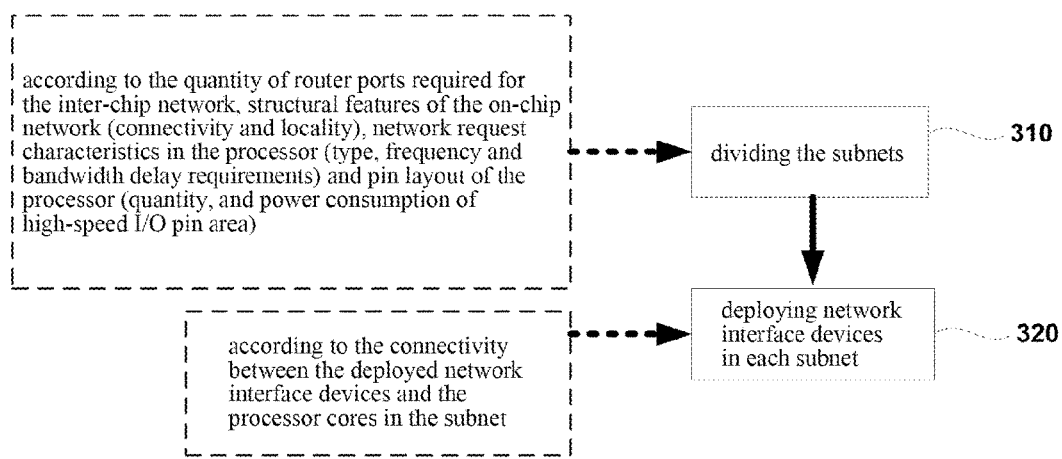
FIG. 6 is a schematic diagram of a method for integrating a many-core processor with a network router of the invention.

The steps in the embodiment of the invention will be described in detail in combination with the accompany drawings:

The invention further relates to a method for integrating a many-core processor with a network router, as shown in FIG. 6, the method comprises the following steps:

step 310: dividing the subnets: according to the quantity of router ports required for the inter-chip network, structural features of the on-chip network (connectivity and locality), network request characteristics in the processor (type, frequency and bandwidth delay requirements) and pin layout of the processor (quantity, and power consumption of high-speed I/O pin area), dividing the on-chip network into multiple subnets capable of balancing the network requests in the on-chip network and implementing rapid data exchange between processor cores in the subnets and network interface devices; and proceeding to step 320;

step 320: deploying network interface devices in each subnet: according to structure and size of the subnet, deploying the network interface devices in the subnet, which requires optimization of the connectivity between the deployed network interface devices and the processor cores in the subnet.

Figure 7:
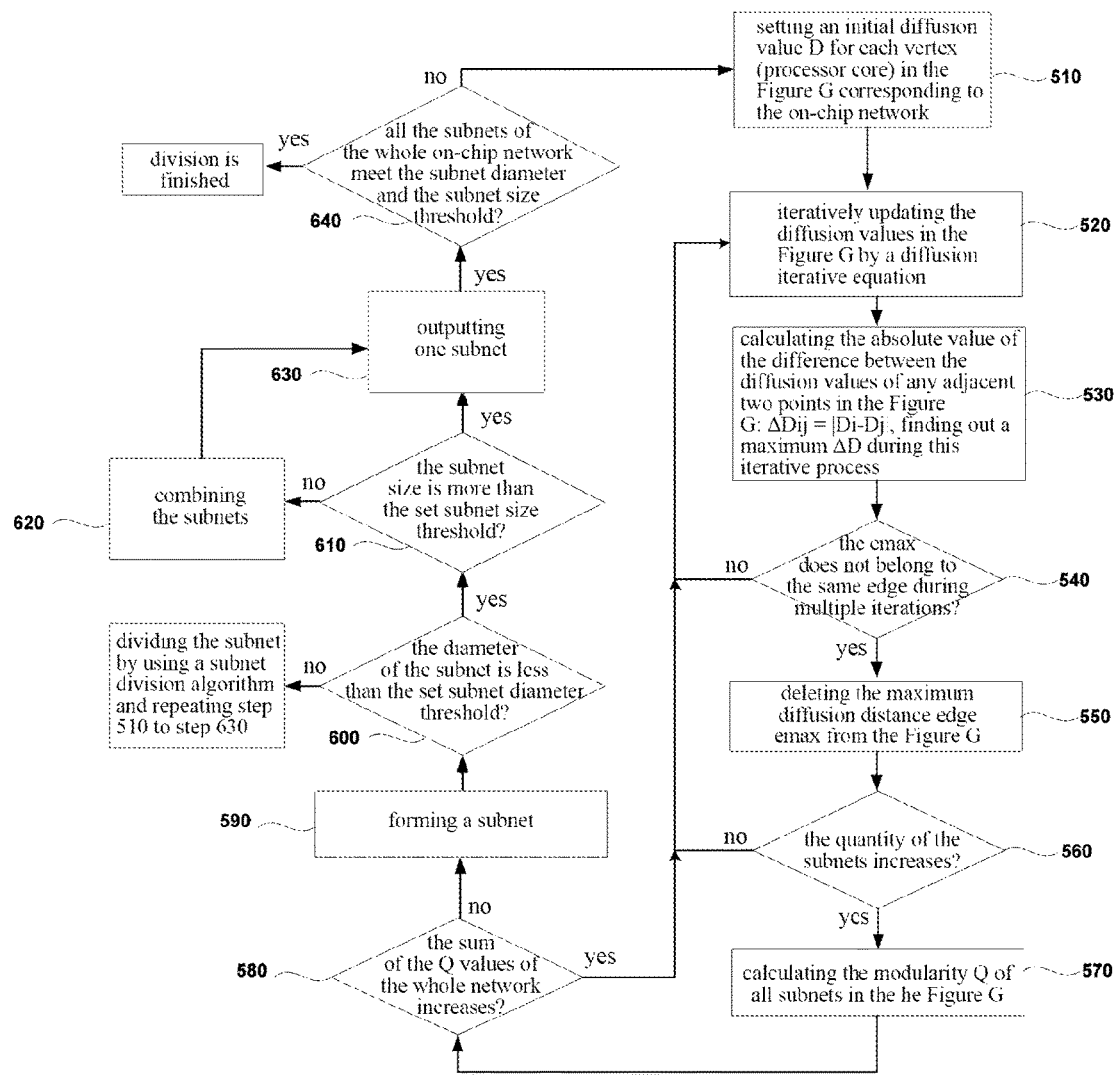
FIG. 7 is a flow diagram of a weighted network-wide diffusion method according to an embodiment of the invention.

For the subnet division in step 310, we put forward a subnet division algorithm based on a weighted network-wide diffusion method, and the input of the algorithm comprises: 1) Figure G=(V,E,W) corresponding to the on-chip network, wherein V is a vertex set, E is an edge set of and a weight set W representing bandwidth of each connection in the network; and 2) an adjacent matrix of the Figure G, wherein $a_{ij}$ is an element. The output of the algorithm is the division S of the figure of the on-chip network, as shown in FIG. 7, and specifically, the subnet division algorithm comprises the following steps:

step 510: setting an initial diffusion value D for each vertex (processor core) in the Figure G (according to the quantity of router ports, structure of the on-chip network, network request characteristics and pin layout of the processor);

step 520: iteratively updating the diffusion values in the Figure G by a diffusion iterative equation, wherein the diffusion iterative equation meets the following definition: provided that the vertex P is connected with vertices L1, L2 . . . Ln, the equation is:

$$D_p = \frac{\sum_{i=1}^{n} D_{Li} \times w_{Li}}{\sum_{i=1}^{n} w_{Li}} \quad (1)$$

The $D_p$ and $D_{Li}$ are the diffusion values of point P and Li respectively, the $w_{Li}$ is the weight of an edge between the point P and Li; and the sub-meaning of the equation is that the diffusion value of one vertex is the weighted mean of the diffusion values of adjacent vertices. As A is an adjacent matrix of the Figure G and $a_{ij}$ is an element of the matrix, more generally, the equation can be expressed as $$D_i = \frac{\sum_{j \in G} D_j \times w_{ij}}{\sum_{j \in G} w_{ij}} \times a_{ij} \quad (2)$$

In order to understand the equation more intuitively, the equation can be changed into the matrix form and defined as:

$$D = \begin{pmatrix} D_1 \\ \dots \\ D_n \end{pmatrix}, M = \begin{pmatrix} \frac{w_{11} \times a_{11}}{\sum_{j \in G} w_{1j}} & \dots & \frac{w_{1n} \times a_{1n}}{\sum_{j \in G} w_{1j}} \\ \vdots & \ddots & \vdots \\ \frac{w_{n1} \times a_{n1}}{\sum_{j \in G} w_{nj}} & \dots & \frac{w_{nn} \times a_{nn}}{\sum_{j \in G} w_{nj}} \end{pmatrix} \quad (3)$$

Thus, the diffusion equation (2) can be described in the matrix form:

$$D = MD \quad (4)$$

step 530: calculating the absolute value of the difference between the diffusion values of any adjacent two points in the Figure G: $\Delta Dij=|Di-Dj|$, finding out a maximum $\Delta D$ during this iterative process, and recording the edge as emax;

step 540: if emax does not belong to the same edge during multiple iterations, proceeding to step 520 for next iteration; otherwise the edge is the maximum diffusion distance edge, proceeding to step 550;

step 550: deleting the maximum diffusion distance edge emax from the Figure G, and proceeding to step 560;

step 560: if the quantity of the subnets does not increase, proceeding to step 520 for next iteration; otherwise proceeding to step 570;

step 570: calculating the modularity Q by the formula (5), the modularity Q being used for describing the intensity of the vertices dividing the subnets (Q value represents the expected value by deducting the percentage of the edge divided in the subnet from the percentage of the edge connecting vertices randomly in the same subnet structure; the higher Q value is, the closer the divided domain connection is). In the network splitting process, the Q value increases gradually and reaches a peak when the network is divided into k subnets. Then, the Q value decreases gradually and the operation of the algorithm is complete. The calculation formula of the Q value is defined as:

$$Q(k) = \sum_{i=1}^{k} \left[ \frac{L(V_i, V_i)}{L(V, V)} - \left( \frac{L(V_i, V)}{L(V, V)} \right)^2 \right] \quad (5)$$

$L(Vi, Vj) = \Sigma_{m \in Vi, n \in Vj} w_{mn}$, the parameter Vi is a divided subnet, and k is the quantity of the divided subnets; proceeding to step 580;

step 580: if the sum of the Q values of the whole network increases, proceeding to step 520 for next iteration; otherwise proceeding to step 590;

step 590: forming a subnet inclusion division S and proceeding to step 600;

step 600: if the diameter of the subnet is more than the set subnet diameter threshold, the subnet needs to be divided continuously based on the algorithm; otherwise proceeding to step 610;

step 610: if the subnet size is more than the set subnet size threshold, proceeding to step 630; otherwise proceeding to step 620;

step 620: combining the subnets; previously, comprehensively judging the subnet to be combined according to the subnet size and the modularity function, as one subnet may be adjacent to multiple subnets; randomly selecting a subnet with small size, calculating the subnet diameter and modularity function Q respectively after the subnet is combined with adjacent subnets, combining the subnets with the maximum modularity for which the combined subnet diameter does not exceed the subnet diameter threshold; and proceeding to step 630;

step 630: outputting one subnet, and proceeding to step 640; and step 640: if all the subnets of the whole on-chip network meet the subnet diameter and the subnet size threshold, outputting the finally divided S; otherwise proceeding to step 510 for subnet division.

Figure 8:
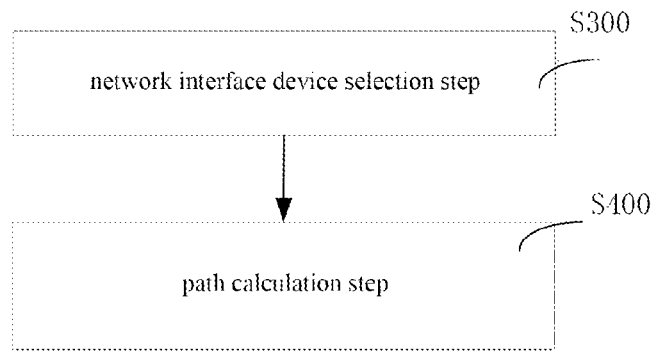
FIG. 8 is a flow diagram of an implementation method of a many-core processor system of the invention.

The invention further provides an implementation method of a many-core processor system, applied to the many-core processor system integrated with a network router. The processor system comprises a processor, an on-chip network, an inter-chip network and a network router. As shown in FIG. 8, the method comprises:

a network interface device selection step S300: selecting a network interface device from the subnet according to the case that the network interface device meets functional requirements and performance requirements of the subnet; and a path calculation step S400: calculating the path from a source processor core to the target network interface device according to the selected network interface device.

Figure 9:
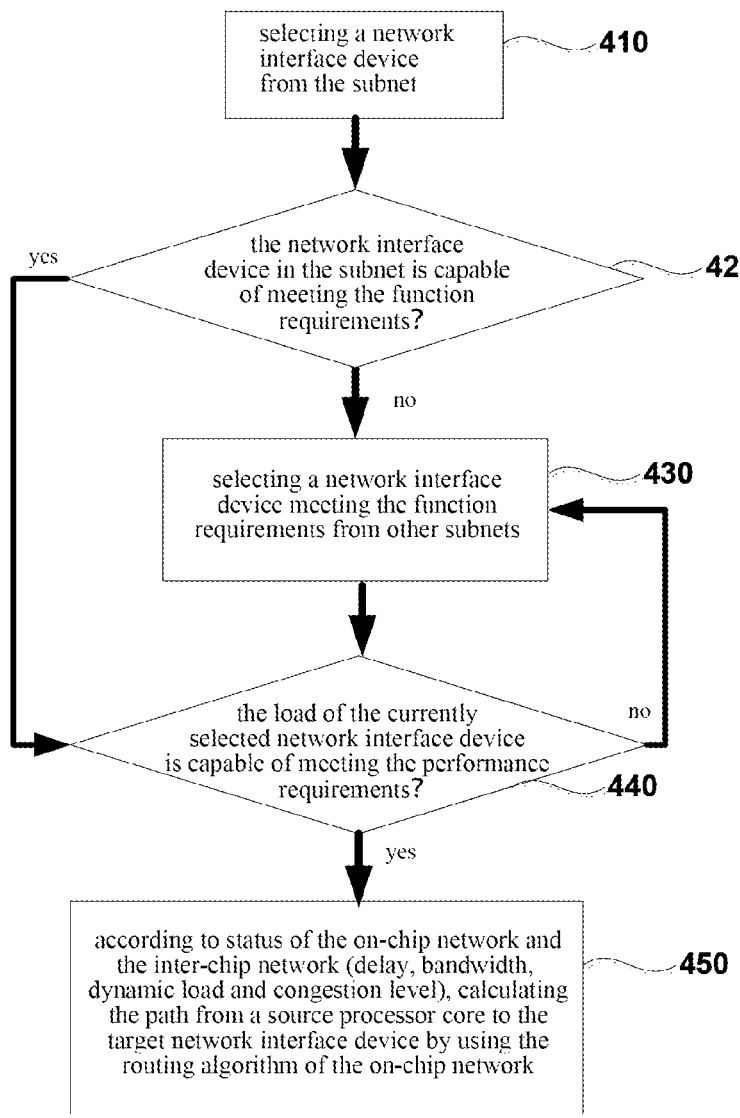
FIG. 9 is a schematic diagram of an implementation method of a many-core processor system according to an embodiment of the invention.

The process of the method in the embodiment of the invention is described in detail in combination with the accompanying drawings:

The invention relates to an implementation method of a processor core based on a network router, as shown in FIG. 9, in particular to the selection of network interface devices and the path reaching the selected network interface devices. The method comprises the following steps:

step 410: selecting a network interface device from the subnet, and proceeding to step 420;

step 420: if the network interface device in the subnet is capable of meeting the function requirements, recording the current network interface device and proceeding to step 440; otherwise proceeding to step 430;

step 430: selecting a network interface device meeting the function requirements from other subnets, recording the current network interface device and proceeding to step 440;

step 440: if the load of the currently selected network interface device is capable of meeting the performance requirements or is the last network interface device, marking the currently selected network interface device as the target network interface device, and proceeding to step 450; otherwise proceeding to step 430;

step 450: calculating the path reaching the network interface device: according to status of the on-chip network and the inter-chip network (delay, bandwidth, dynamic load and congestion level), calculating the path from a source processor core to the target network interface device by using the routing algorithm of the on-chip network (e.g. dimension ordered routing algorithm and self-adaptive routing algorithm in Mesh and Torus networks; and forgetfulness routing algorithm in Fat-tree network).

In order to make the purpose, technical solution and advantages of the invention more clear, the method and system of the invention for integrating a network router in a multi-core or many-core processor is further detailed in combination with accompanying drawings and embodiments. It should be understood that various embodiments described herein are only used to explain the invention rather than defining the invention.

Figure 10:
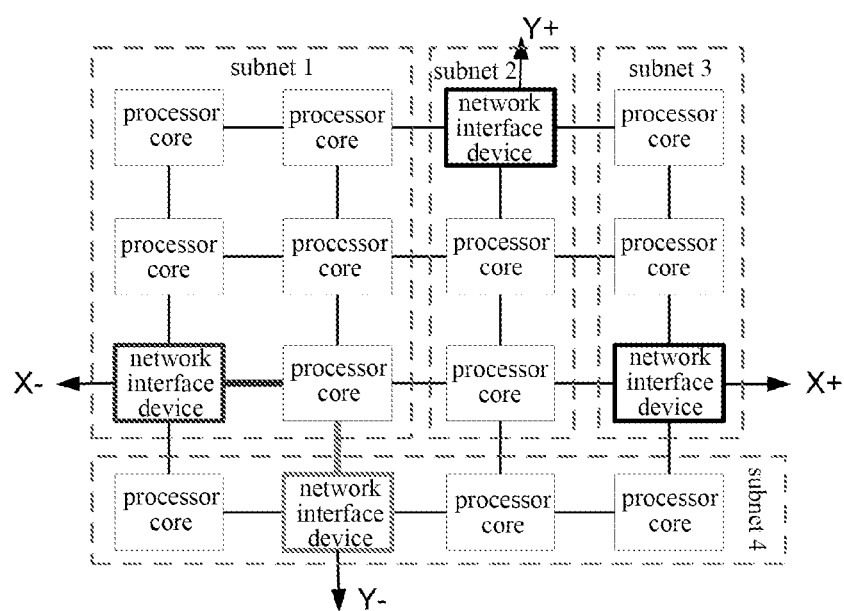
FIG. 10 is a structural diagram of a many-core processor of an inter-chip Mesh network according to an embodiment of the invention.

In order to describe the invention more intuitively, the invention provides an example of a many-core processor integrated with a network router, which is used to construct a Mesh network of the whole system (Mesh topology for the inter-chip network), but not improperly limit thereto. As shown in FIG. 10, in the example, four network interface devices are integrated in a many-core processor (Mesh topology for the inter-chip network) and correspond to four directions X+, X−, Y+, Y− required for the Mesh topology of the inter-chip network respectively. According to the quantity of the network interface devices, the on-chip network topology and network requests among the processor cores, the on-chip network is divided into 4 subnets in FIG.

10, and four network interface devices are distributed to four subnets according to the structural features of the on-chip network (connectivity and locality), network request characteristics in the processor (type, frequency and bandwidth delay requirements) and pin layout of the processor (quantity, and power consumption of high-speed I/O pin area).

If the processor core sends a message in X-direction, the network interface device corresponding to the X-direction will be selected (selecting network interface devices by function); when the message to be sent by the processor core in the subnet 1 is capable of being sent in both X-direction and Y-direction, the network interface device corresponding to the X-direction will be selected preferably; if the network interface device corresponding to the X-direction is at a high load and the network interface device corresponding to the Y-direction is at low load, the former will be selected.

Accordingly, if the inter-chip network is of 3D Torus network topology, 6 network interface devices are arranged (in six directions X+, X−, Y+, Y−, Z+, Z− respectively) and the on-chip network is divided into 6 subnets, and each subnet is provided with a network interface device.

In conclusion, the invention provides a many-core processor system integrated with a network router and integration and implementation method thereof, which improves network access capability of the whole processor and helps realize load balance when a large number of processor cores access the network, saves private data exchange resources of the router in the processor of the prior art, beaks through the expansibility limit of a centralized network router in the conventional processor, and improves expansibility of the network router.

Of course, the invention may have other embodiments. Those skilled in the art can make various corresponding changes and modifications according to the invention without departing from the spirit and essence of the invention, but such changes and modifications should be incorporated in the protection scope of the claims appended to the invention.

The invention claimed is:

1. A method for integrating a many-core processor system with a network router, which is applied to a many-core processor system comprising a processor, an on-chip network, an inter-chip network and a network router, the method is characterized by comprising:

step 1: taking the on-chip network as a corresponding Figure G, the processor cores corresponding to vertices of Figure G and connection lines among the processor cores corresponding to edges of Figure G, the Figure G comprising a vertex set V, an edge set E and a weight set W, the Figure G being expressed as Figure G=(V, E,W);

step 2: setting initial diffusion values of the vertices in the vertex set V;

step 3: iteratively updating the diffusion values based on the initial diffusion values, obtaining a maximum absolute value of a difference between the diffusion values of adjacent vertices in iterative process and recording the edge corresponding to the maximum absolute value; if the maximum absolute values correspond to the same edge in multiple iterative processes, deleting the edge corresponding to the maximum absolute value, or proceeding with the iterative updating step of the diffusion values;

step 4: if a quantity of subnets obtained in the iterative updating step of the diffusion values does not increased, proceeding to the iterative updating step of the diffusion values, or calculating modularity Q; if the modularity Q value increases in the calculation step of the modularity, proceeding to the iterative updating step of the diffusion values, or forming a divided subnet;

step 5: if a diameter of the divided subnet is more than that of the subnet, continuing to divide the divided subnet and proceeding to the subnet division step, or judging size of the divided subnet according to the size threshold of the subnet;

step 6: if a size of the divided subnet is smaller than the size threshold of the subnet in the subnet size judgment step, combining the subnets and outputting the finally divided subnets; and step 7: if all the subnets meet the size threshold and the diameter of the subnet, outputting the finally divided subnets; and step 8: deploying at least one network interface device in a subnet in a distributed mode in order to guarantee optimization of the connectivity between the deployed network interface device and the processor cores in the subnet and to implement rapid data exchange of the on-chip network or the inter-chip network.

2. The method for integrating a many-core processor system with a network router according to claim 1, characterized in that the equation of diffusion and iteration in the step 3 meets the following definition: provided that the vertices L1, L2 . . . Ln are connected with each other, the equation is:

$$D_i = \frac{\sum_{j \in G} D_j \times w_{ij}}{\sum_{j \in G} w_{ij}} \times a_{ij}$$

wherein the Di and Dj are the diffusion values of point Li and Lj respectively, the $w_{ij}$ is the weight of an edge between the point Li and Lj; and the $a_{ij}$ is an element in an adjacent matrix of the Figure G.

3. The method for integrating a many-core processor system with a network router according to claim 1, characterized in that the calculation formula of the modularity Q is:

$$Q(k) = \sum_{i=1}^{k} \left[ \frac{L(V_i, V_i)}{L(V, V)} - \left(\frac{L(V_i, V)}{L(V, V)}\right)^2 \right]$$

wherein $L(V_i, V_j) = \sum_{m \in Vi, n \in Vj} w_{mn}$, the parameter Vi is a divided subnet, $w_{mn}$ is the weight of an edge between point m and point n, and k is a quantity of the divided subnets.

4. A many-core processor system integrated with a network router, in which the method for integrating a many-core processor system with a network router according to claim 1 is used, the many-core processor system comprises a processor, an on-chip network and an inter-chip network, characterized in that the many-core processor system further comprises:

a network router for network interfacing and data exchange, and comprising multiple network interface devices embedded into the on-chip network in a distributed mode;

wherein the network interface devices are disposed within the subnets divided from the on-chip network and taken as a network interface in the same processor or among the processors for data exchange based on the on-chip network or the inter-chip network.

5. The many-core processor system integrated with a network router according to claim 4, characterized in that the on-chip network is divided into multiple subnets, and each of the subnet is provided with at least one network interface device.

6. The many-core processor system integrated with a network router according to claim 4, characterized in that the network interface device further comprises a network processing engine for parsing network data packet transmitted by the on-chip network interface and the inter-chip network interface to implement a network communication protocol.

7. An implementation method of a many-core processor system, which is applied to the many-core processor system integrated with a network router according to claim 2, the processor system comprising a processor, an on-chip network, an inter-chip network and a network router, the implementation method is characterized in comprising:
- a network interface device selection step: selecting a network interface device from the subnet according to the case that the network interface device meets functional requirements and performance requirements of the subnet; and
- a path calculation step: calculating the path from a source processor core to the target network interface device according to the selected network interface device.

* * * * *